(No Model.)

R. F. WILCOX.
DEVICE FOR ATTACHING PICKETS TO WIRE FENCES.

No. 406,490. Patented July 9, 1889.

Witnesses
F. G. Fischer
E. E. Higdon

Inventor
Reuben F. Wilcox
By his Attorney J. C. Higdon

UNITED STATES PATENT OFFICE.

REUBEN F. WILCOX, OF KANSAS CITY, MISSOURI.

DEVICE FOR ATTACHING PICKETS TO WIRE FENCES.

SPECIFICATION forming part of Letters Patent No. 406,490, dated July 9, 1889.

Application filed November 15, 1888. Serial No. 290,866. (No model.)

*To all whom it may concern:*

Be it known that I, REUBEN F. WILCOX, of Kansas City, Jackson county, Missouri, have invented certain new and useful Improvements in Devices for Attaching Pickets to Wire Fences, of which the following is a full, clear, and exact description, reference being had to the accompanying drawings, forming a part thereof.

My invention relates to an improved device for attachment of pickets or palings upon barbed or other wire cables in the construction of fixed or movable fences, and particularly to a novel implement or tool that will facilitate the operation of securing the pickets in place on the wires or strands.

The object of my invention is to provide a simple and convenient implement which may be quickly applied to clamp a picket in upright position upon a wire strand, and thus hold it in place while the binding-loops are applied and secured by the use of a winding-tool that forms a part of the implement.

With this object in view my invention consists in certain features of construction and combination of parts, which will be hereinafter described, and pointed out in the claims.

Figure 1:
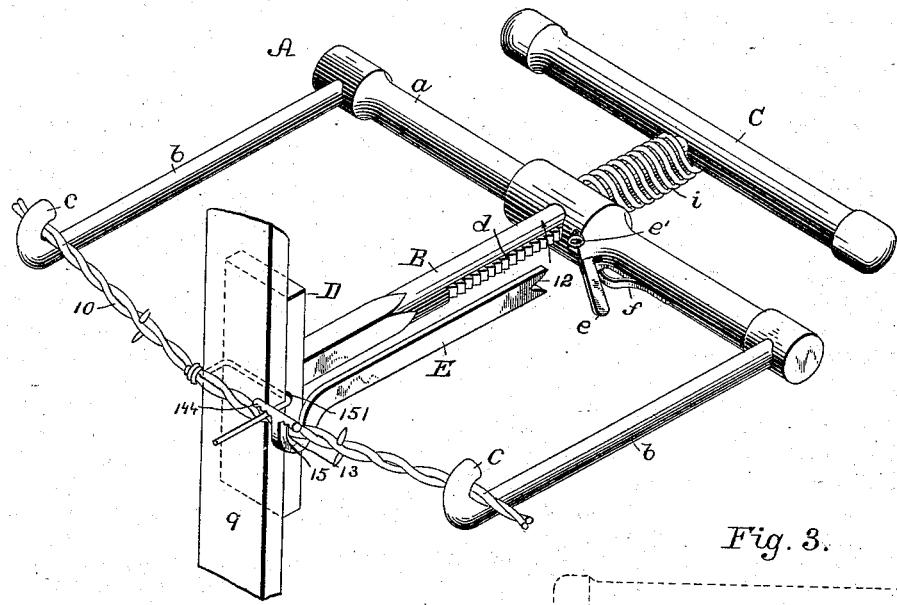
Figure 2:
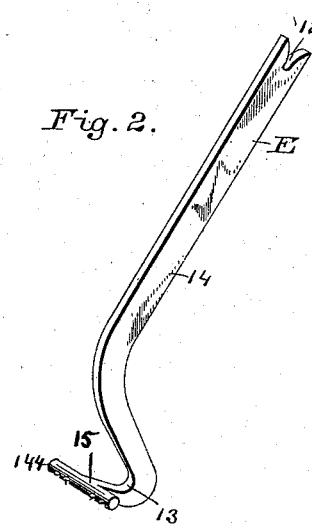
Figure 3:
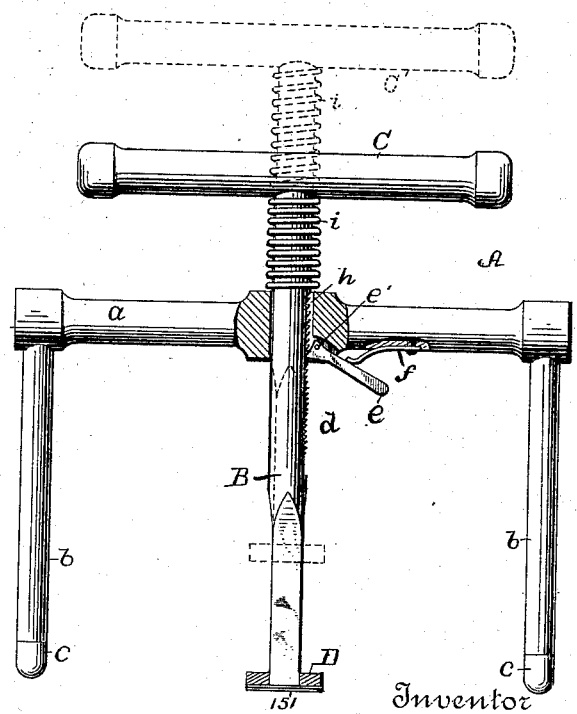

Referring to the drawings that constitute a part of this specification, Figure 1 is a perspective view of the device in position as applied to a picket, the binding-loop and tool for securing the same upon the cable being also shown. Fig. 2 is an enlarged detached view of the twisting-tool, which is an adjunctive feature of the picket-attaching device. Fig. 3 is a view in elevation of the picket-clamp removed from the wire-fence cable, a portion of the device being shown in section and part of the same in dotted lines.

In Figs. 1 and 3, A represents a frame or yoke that consists, essentially, of a cross-bar $a$, from which extend the parallel limbs $b$ in the same direction and plane. The limbs $b$ may be made integral with the cross-bar $a$, or secured thereto at the ends of the same, as may be preferred. They are of equal length and have their free ends $c$ turned up into hook form, as shown, to adapt them to engage a wire cable-strand, as will be further explained.

The cross-bar $a$ is perforated at its center of length to permit the free insertion through said orifice of the sliding bar B, which bar is provided with a cross-handle C at its outer end, while upon the other extremity a flat bearing-block D is firmly attached at right angles to the bar, as shown in Figs. 1 and 2.

On one side of the sliding bar B a series of ratchet-teeth $d$ are cut, which teeth are so shaped that the pawl or handled dog $e$, that is pivoted upon the cross-bar $a$, will engage said ratchet-teeth with its toe $e'$, a spring $f$ being secured upon the cross-bar to bear with its free end on the handle of the dog $e$ and cause it to mesh with the serrations of the bar, as shown in Fig. 2.

A spiral spring $i$ is placed on the sliding bar B, so as to bear with its ends upon the cross-handle C and cross-bar $a$, the spring being of such relative strength and elasticity as to hold the handle C normally projected from the cross-bar $a$ when the dog $e$ is released from the ratchet-teeth $d$.

In Fig. 2 is shown the device or tool used in conjunction with the clamp A to attach the wire loops which hold the picket upon the barbed or other wire cable. The tie-wire loops are secured around the pickets by wrapping or coiling their ends upon the fence-cable 10, as shown in Fig. 1, and, as will be noticed, a groove 151 is cut transversely in the face of the block D, so as to permit the ready insertion of the tie-wire between the adjacent surfaces of the picket 9 and block D.

It will be seen that the tool E, Figs. 1 and 2, consists of a metal lever-bar of suitable length to afford proper leverage, which is bent at 13 to adapt it to hook upon the cable-strand 10, the short limb 15 being furnished with lateral projections or fingers 144, that are notched at intervals on their lower faces. On the other end of the lever-bar E a notch 12 is formed, the use of which will be indicated.

In operation the clamp A is hooked under the cable 10, as shown in Fig. 1, at a point where a picket is to be attached to said cable, the handle C being retracted, as shown in dotted lines in Fig. 3. A picket 9 is now placed upright between the cable and block D, and by compression of the spring $i$, effected by the hands of the operator, the handle C is forced toward the cross-bar $a$, which movement will secure the picket clamped against the cable in an obvious manner. The tie-wire being inserted in the groove 151 so as to allow even ends to project at the side edges of the picket, the forked end 12 of the lever E is employed to bend these projecting ends toward the wire 10 and at right angles thereto, by placing the crotch on the tie-wire and resting the ends of the fork 12 on the outer face of the picket, then swinging the bar E outward, which movement will bend the tie-wire outward and across the cable ready to be coiled on it. The tool E is now reversed, and its bent end 13 caused to bear on the lower surface of the cable. This will cause the end 144 to rest upon the tie-wire, so that a revolution of the lever E around the cable 9 will wind or coil the end of the tie-wire upon said cable. By changing the position of the lever 13 to the other side edge of the picket the remaining end of the tie-wire may be wound in place on the cable, and thus secure the picket to the cable. After a tie-wire has been affixed, as just described, the clamp B may be released by a detachment of the toe of the dog e from the teeth d, which will allow the spring i to retract the bar B. The clamp may now be placed on another cable to continue the operation of attachment of the picket upon two or more fence-cables, which lie in parallel planes, and thus serve to afford a substantial picket-support.

The implement hereinbefore described may be employed to attach the pickets upon an ordinary barbed-wire fence already in position, or may be utilized to construct picket fence in sections, that may be bundled for shipment or future erection at any desired point.

Having fully described my invention, what I claim as new, and desire to secure by Letters Patent, is—

1. The herein-described tying-tool, comprising a body portion bent at 13 to form a short limb 15, adapting it to hook upon the ends of the strand-wires and having lateral projections 144 with notches upon their lower faces, substantially as set forth.

2. The combination, with a yoke having limbs that are provided with hooked ends and a sliding clamping-bar, of a ratchet-toothed rack formed on the sliding bar, a locking-dog, and a retracting-spring, substantially as set forth.

3. The combination, with a yoke comprising a perforated cross-bar and two parallel limbs having hooks on their free ends and a bar that is provided with ratchet-teeth and adapted to slide in the perforation of the cross-bar, of a pivoted locking-dog and a spiral retracting-spring, substantially as set forth.

4. The combination, with a yoke having limbs with hooked ends, of a toothed sliding bar having a cross-handle and a clamping-block, a pivoted dog, a spring to actuate the dog, and a spring to retract the sliding bar, substantially as set forth.

In testimony whereof I affix my signature in presence of two witnesses.

REUBEN F. WILCOX.

Witnesses:
E. E. HIGDON,
J. C. HIGDON.